United States Patent [19]

Chen

[11] Patent Number: 4,667,253
[45] Date of Patent: May 19, 1987

[54] OPTICAL LINE SCANNING IMAGING DEVICE

[76] Inventor: Philip L. Chen, 4275 Regency Dr., Colorado Springs, Colo. 80906

[21] Appl. No.: 671,293

[22] Filed: Nov. 14, 1984

[51] Int. Cl.⁴ .............................................. H04N 1/04
[52] U.S. Cl. ...................................... 358/293; 378/57
[58] Field of Search ................ 378/57; 358/285, 293, 358/294

[56] References Cited

U.S. PATENT DOCUMENTS

| | | | |
|---|---|---|---|
| 4,107,740 | 8/1978 | Cooley | 358/293 |
| 4,179,100 | 12/1979 | Sashin et al. | 378/19 |
| 4,326,222 | 4/1982 | Connin et al. | 358/285 |
| 4,348,593 | 9/1982 | Seachman | 358/293 |
| 4,366,382 | 12/1982 | Kotowski | 378/57 |
| 4,370,678 | 1/1983 | Kitamura | 358/285 |
| 4,385,325 | 5/1983 | Chen | 358/293 |
| 4,442,459 | 4/1984 | Fukui et al. | 358/293 |
| 4,477,836 | 10/1984 | Yetjens | 358/294 |

Primary Examiner—Ronald C. Capossela
Attorney, Agent, or Firm—Edward A. Sokolski

[57] ABSTRACT

Material which may be a document or picture of which an image is to be produced or transmission, as in a facsimile device, is driven by pinch rollers means of past a light source in a controlled, synchronized manner by a stepping motor. As the rollers are driven, successive scan line images of the document are channeled through an elongated slit and a light-directing channel through a lens onto a light-sensitive device, such as a linear array formed by a charge-coupled device (CCD). The images received by the CCD are converted thereby to electrical form and appropriately processed for transmission or other utilization.

6 Claims, 11 Drawing Figures

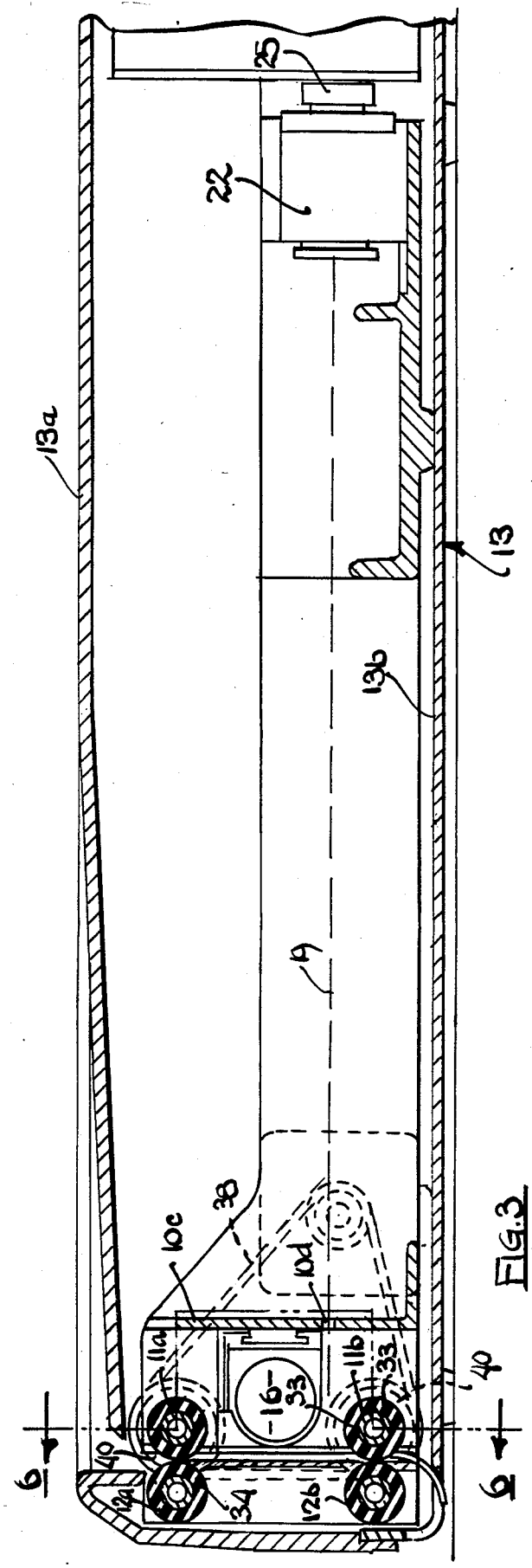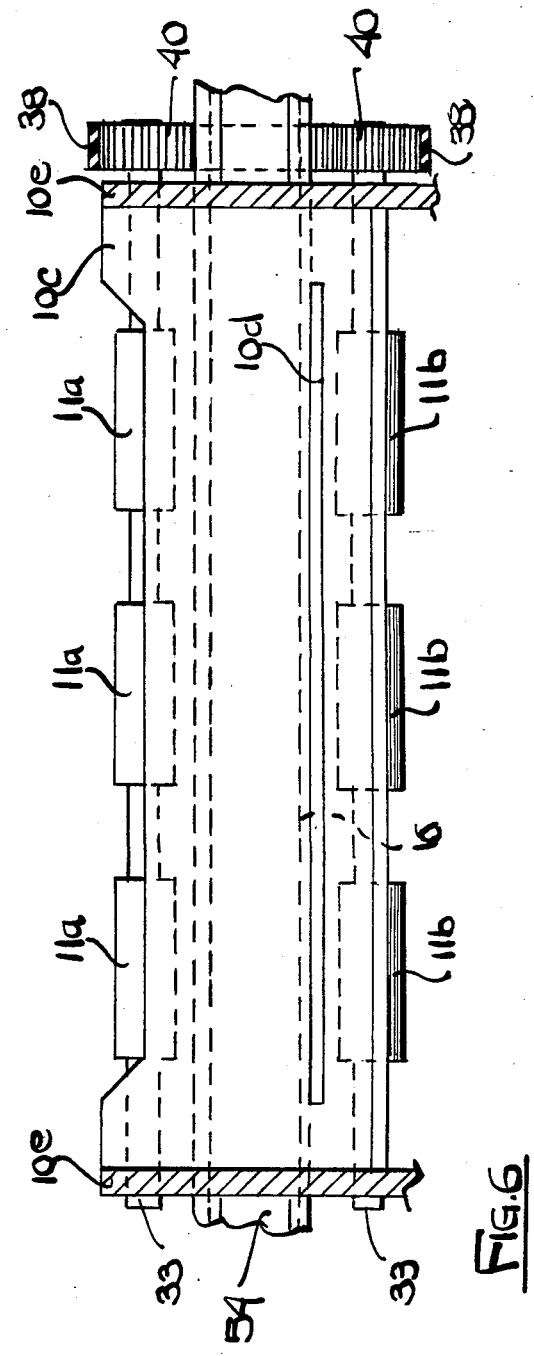

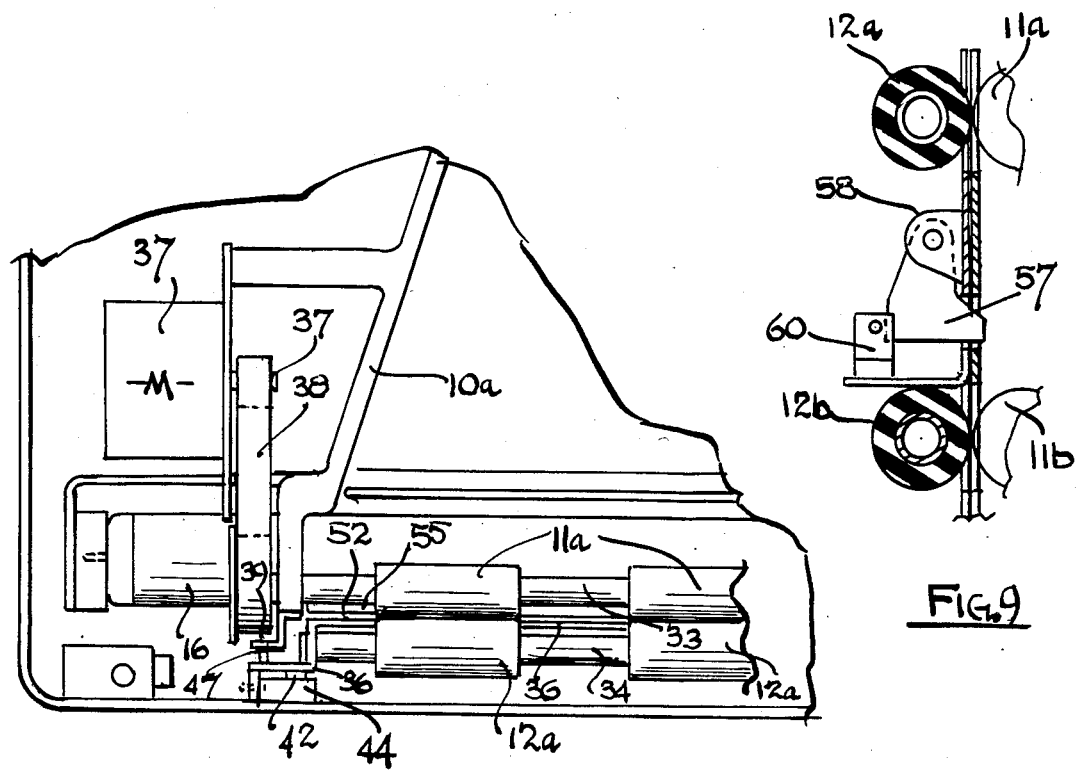
FIG. 7A
FIG. 9
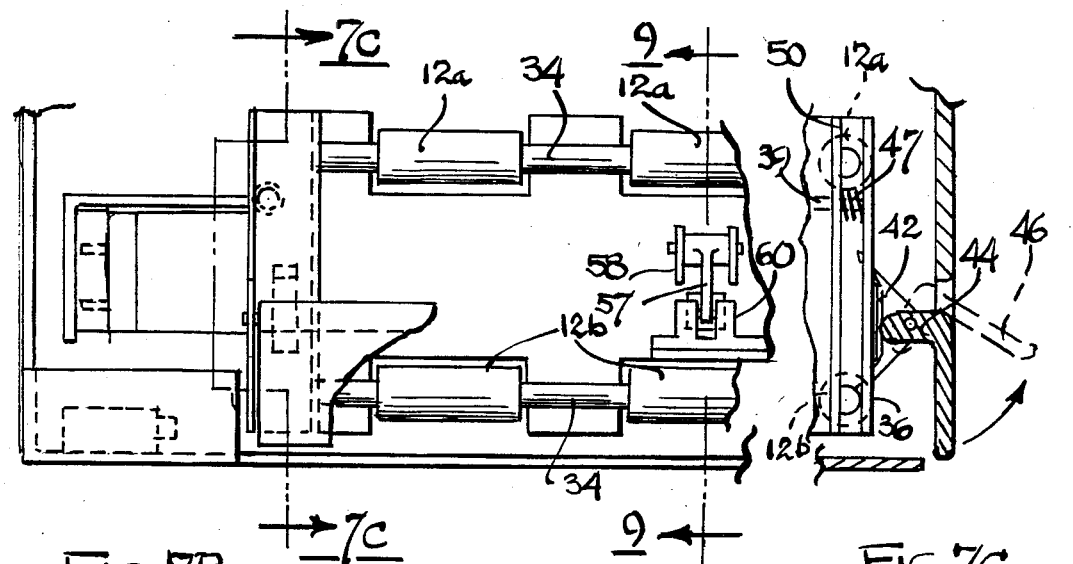
FIG. 7B
FIG. 7C

OPTICAL LINE SCANNING IMAGING DEVICE

This invention relates to an optical line scanning and imaging device, and more particularly to an optical scanner suitable for use in generating images suitable for facsimile transmission.

Linear optical scanning devices for generating images are used in a number of different applications including medical radiography, as described for example in U.S. Pat. No. 4,179,100 to Sashin et al.; in baggage inspection systems, such as described in U.S. Pat. No. 4,366,382 to Kotowski; and in facsimile systems, as described in my U.S. Pat. No. 4,385,325. These prior art systems tend to be overly complicated and expensive in their construction which not only limits the commercial potential for their utilization, but also makes servicing and maintenance of these units somewhat difficult and costly.

The optical linear system of the present invention obviates these shortcomings of the prior art in providing a simple, yet highly accurate optical imaging system which employs a minimum number of parts and is of relatively simple and economical construction, and by virtue of such simplicity is relatively easy and economical to repair and maintain. Further, the simplicity of construction of the present device contributes to reliable operation in the field.

The device of the present invention achieves the aforementioned improvements by utilizing a pinch roller drive mechanism which drives the material to be imaged past a light source. This drive mechanism is quite simple and of reliable construction and can be operated with little difficulty by inexperienced personnel. Successive scan line images of this material which may comprise a document or picture are formed into a narrow line image which is directed through a channel to an imaging lens. The image is focused by the lens onto a linear photo-sensitive detector array, such as a charge-coupled device (CCD), which converts the image into electrical signals. These electrical signals may be fed to an appropriate conventional signal processor which places these signals in proper form for transmission or utilization on a local imaging device. The commencement of the scanning is signalled by means of a position detector which mechanically senses when the material to be scanned enters the imaging area, and again when it leaves such area, such that the scanning can be properly controlled. Further, a simple, yet highly effective mechanism is provided to rapidly and easily enable the disengagement of the pinch rollers from the material being scanned to avoid damage to such material should it become jammed in the rollers.

It is therefore an object of this invention to provide a simple and economical optical line scan imaging device for use in devices such as facsimile equipment.

It is a further object of this invention to provide a highly reliable easy to operate and easy to maintain and service optical ine scanner suitable for providing imaging signals for use in facsimile transmission.

Other objects of the invention will become apparent as the description proceeds in connection with the accompanying drawings of which FIG. 1 is a schematic drawing of a preferred embodiment of the invention;

FIG. 3 is a cross-sectional view taken along the plane indicated by 3—3 in FIG. 2;

FIG. 6 is a cross-sectional view taken along the plane indicated by 6—6, in FIG. 3;

FIG. 7A is a top plan sectional view illustrating the pinch rollers and drive mechanism of the preferred embodiment;

FIG. 7B is a front elevational sectional view illustrating the pinch rollers;

FIG. 7C is a cross-sectional view taken along the plane indicated by 7C—7C, in FIG. 7B;

FIG. 9 is a cross-sectional view taken along the plane indicated by 9—9 in FIG. 7B.

Figure 1:
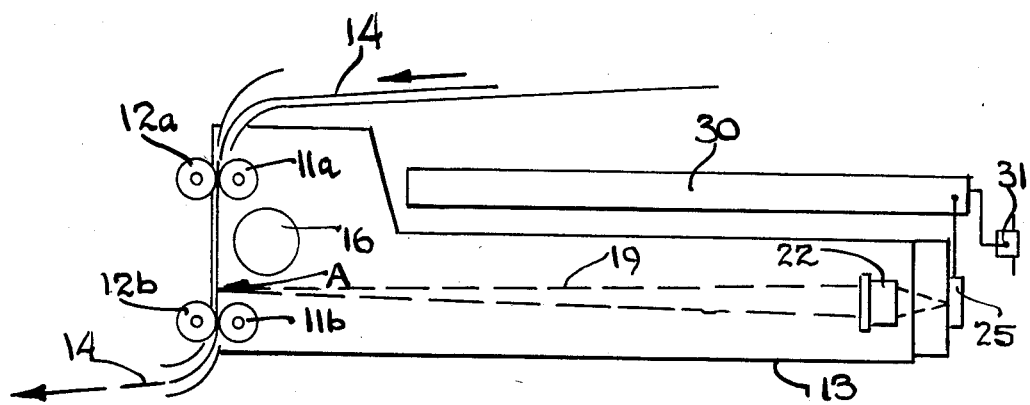
Figure 5:
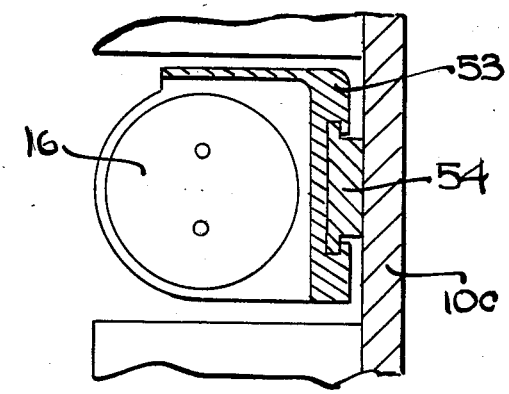
FIG. 5 is a cross-sectional view taken along the plane indicated by 5—5, in FIG. 2.

Referring now to FIG. 1, a preferred embodiment of the device of the invention is schematically illustrated. The device includes pairs of pinch rollers 11a, 12a and 11b, 12b, by means of which a document 14 to be imaged is driven. Light from light source 16, which may comprise an incandescent lamp or a fluorescent lamp excited by DC, provides light onto the face of the document, this light being channeled in a linear beam 19 which effectively provides a succession of line scan images of the document as it passes between the rollers. Thus, successive linear elements of the document as they arrive at point "A" are appropriately formed into a fan-shaped beam 19 which strikes lens 22 and is focused by this lens onto a photo-sensitive linear detector array 25. The detector array 25 may comprise a charge-coupled device (CCD). The output of detector array 25, which is in the form of electrical signals representing the image, is fed to signal processor 30 which appropriately processes the imaged signals by techniques well known in the art. The output of signal processor 30 may be fed to a host computer through interface circuitry 31.

Referring now to FIGS. 2-9, the preferred embodiment is illustrated in detail. Mounted within casing 13 is an upstanding wall structure 10 which includes oppositely positioned walls 10a and 10b which diverge from each other towards the rollers 11a, 12a and 11b, 12b in the general shape of a fan. The diverging ends of walls 10a and 10b, are interconnected by a wall member 10c. Casing member 13 has a top cover 13a as well as a bottom portion 10b such that the interior of the casing is substantially closed off from ambient light. Thus, wall structure 10 forms a light channel which, as to be explained further on in the specification, channels light between the material being scanned and the optical image forming portions of the system. Wall member 10c has an elongated narrow slot 10d (see FIG. 6) formed therein which collimates the light beam.

Figure 4:
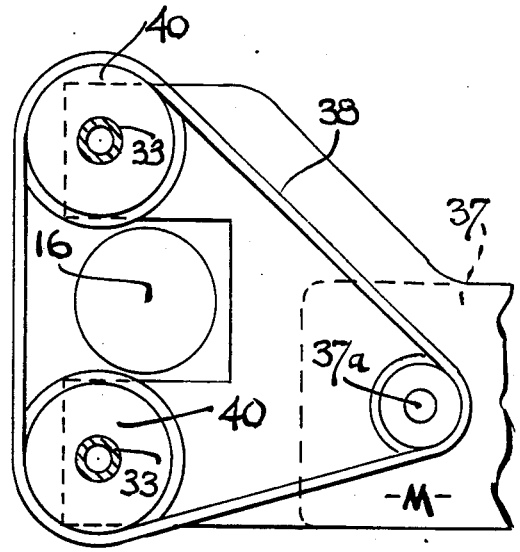
FIG. 4 is a cross-sectional view taken along the plane indicated by 4—4 in FIG. 2.
Figure 2:
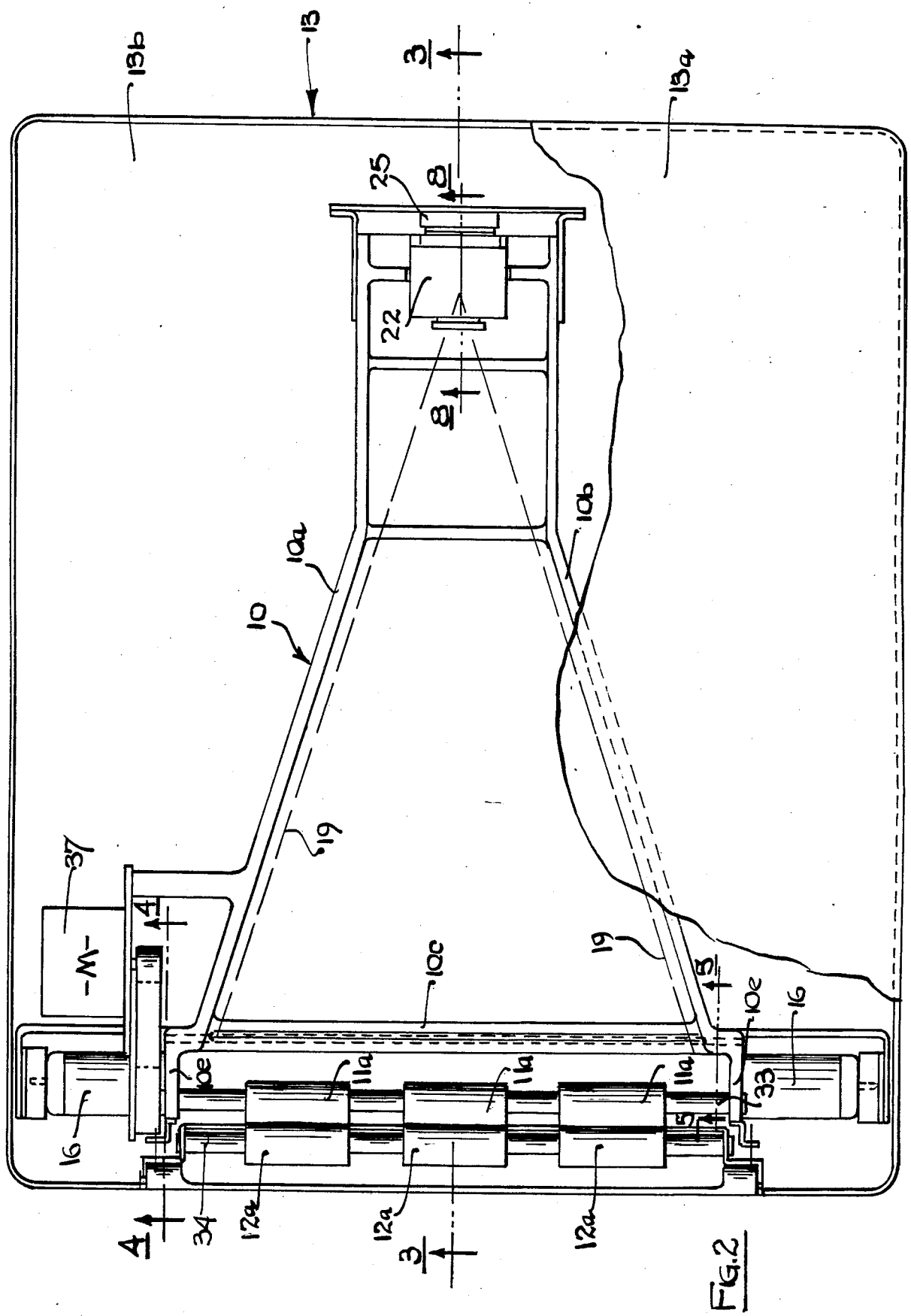
FIG. 2 is a top plan view of the preferred embodiment.

Rotatably supported on support flanges 10e is a shaft member 33 which has a plurality of rollers 11a, which may be of rubber fixedly attached thereto. Directly opposite shaft 33 is a similar shaft 34 which is rotatably supported on brackets 36 which in turn are supported in "floating" fashion on the wall of casing 13. The paired rollers 11a, 12a and 11b, 12b form pinch rollers for driving the material to be scanned through the scanning area with rollers 11a, 11b forming drive rollers and 12a, 12b forming idlers. Rollers 11a and 11b are rotatably driven by means of a stepping motor 37 which, as best can be seen in FIG. 4, drives a pulley 38 which interconnects the output shaft 37a of the stepping motor with pulley members 40 fixedly attached to shafts 33. As best can be seen in FIGS. 7B and 7C, the support brackets for the idler roller shafts 34 are supported on pin members 39 for limited freedom of motion towards and away from drive rollers 11a and 11b. The idler rollers 12a and 12b, as best can be seen in FIG. 7C, are resiliently urged against the drive rollers 11a and 11b respectively by means of leaf springs 42 and arm member 44 which normally abuts against this springs. To release the idler rollers from the drive rollers, such as for example as in the case of a paper jam or other malfunction, plate 46 need merely be lifted upwardly as indicated in FIG. 7C by the arrow and dashed illustration. In such case, the pressure against spring 42 is released and plate 46, and along with it roller shafts 34 and rollers 11b, are urged away from rollers 11a by coil springs 47 which are installed on pins 39 between plate 50, which is fixedly attached to the casing, and floating brackets 36. A small separation is provided at all times between the floating brackets 36 and the fixed plate 55 by projections 52 which are formed on the walls of floating bracket member 36 and abut against fixed plate 55 which is mounted on the casing. Mounted within the casing between and forward of rollers 11a and 11b is fluorescent lamp 16 which provides a light source for the imaging. As can best be seen in FIG. 5, fluorescent lamp 16 is mounted in a fixture member 53 which slidably fits on fixed support member 54 which is fixedly attached to casing 13. The lamp fixture member 53 fits on support member 54 in a bayonet type fit and thus can be readily removed from the casing for replacement of the lamp as need be. The entry of the material to be scanned between the rollers is sensed by a pivotally mounted sensing arm 57, this arm being pivotally mounted on bracket member 58 attached to the casing. When the material being scanned is between the rollers, arm 57 is driven towards detector member 60, which may be an optical magnetic or mechanical detector, which is actuated by such movement of arm 57. Detector 60 thus provides a signal to the control circuitry indicating when material being scanned enters the rollers and leaves the rollers, thus faciliating proper control of the imaging system.

Figure 8:
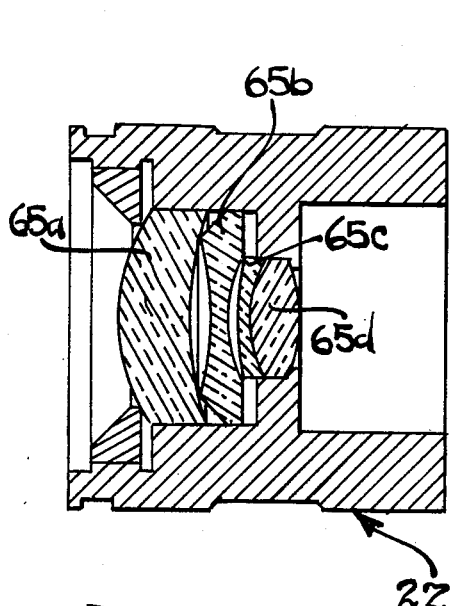
FIG. 8 is a cross-sectional view taken along the plane indicated by 8—8 in FIG. 2.

Mounted on the casing member at the converging end of the fan-shaped channel formed by wall structure 10 is a lens assembly 22 which has a lens system mounted therein for focusing the image onto linear detector array 25 mounted opposite the lens structure. Detector array 25, as already noted, may comprise a charge-coupled device (CCD). Lens assembly 22 as can best be seen in FIG. 8, is a compound lens assembly comprising four lens elements 65a–65d. This lens assembly, which may be a modified Tessar-type lens, has a good depth of focus, is adaptable for miniaturization, and has low distortion and high resolution along with a flat image plane and a wide field.

As explained in connection with FIG. 1, the material to be scanned 14 is passed between paired rollers 11a, 12a and 11b, 12b. As portions of this sheet of material pass opposite elongated slot 10d formed in plate 10c, the light rays incident thereon are reflected from the surface of such material and limited to elongated flat beam by means of aperture slot 10d. This light beam is channeled through the fan-shaped channel formed by upright wall structures 10a and 10b and directed through lens 65 which focuses this line image onto the detector array 25. The stepping motor 37 successively drives line segments of the material being scanned to provide successive such line images to the detector array for appropriate processing and integration into the image of the material being scanned.

The control electronics and processing equipment needed for controlling the operation of the scanner and processing the signals generated thereby may be of types well known to those skilled in the art and form no part of the present invention.

While the invention has been described and illustrated in detail, it is clearly to be understood that this is intended by way of illustration and example only and is not to be taken by way of limitation, the spirit and scope of the invention being limited only by the terms of the following claims.

I claim:

1. An optical line scanning and imaging system for generating electrical signals in accordance with successive linear elements of material comprising:

a light source, means for successively driving linear elements of said material past said light source.

means for forming the output of said light source into a flat planar light beam, a linear array of detectors, means running from said light source towards said detectors for channeling said light beam from said light source convergently towards said array of detectors, and lens means for focusing the light beam onto said array of detectors.

2. The system of claim 1 and further including means for providing an electrical signal when the material being scanned is being fed between said rollers.

3. The system of claim 2 wherein said means for providing an electrical signal when the material is being fed between the rollers comprises a pivotally mounted sensor arm positioned in the path of said material and detector means for providing an electrical output signal when actuated, said arm means being driven by said paper to actuate the detector means.

4. The system of claim 1 wherein said means for channeling the light beam comprises a pair of opposing upright wall structures which converge towards each other in the direction towards said lens means.

5. The system of claim 4 and further including a third upright wall structure joining together said pair of upright wall structures at the diverging ends thereof, the collimating means comprises an elongated narrow slot formed in said third upright wall structure.

6. An optical line scanning and imaging system for generating electrical signals in accordance with successive linear elements of material comprising:

a light source, means for successively driving linear elements of said material past said light source including a set of drive rollers, fixed plate means for rotatably supporting said set of drive rollers, motor means for rotatably driving said set of drive rollers, a set of idler rollers, and floating bracket means for rotatably supporting said idler rollers in opposing relationship to said drive rollers, first spring means for resiliently urging the floating bracket means and therewith the idler rollers linearly towards the drive rollers, second spring means for resiliently urging the floating bracket means and therewith the idler rollers linearly away from the drive rollers, pivotally supported arm means for actuating said first spring means so as to drive said rollers linearly against the urging action of said second spring means in a first pivotal position of said arm means and for releasing said first spring means so as to permit said second spring means to urge the idler rollers linearly away from said drive rollers in a second pivotal position of said arm means, means for forming the output of said light source into a flat planar light beam, a linear array of detectors, said light beam being directed towards said detectors, and lens means for focusing the light beam onto said array of detectors.

* * * * *